United States Patent [19]

Gaudreault

[11] 3,899,693

[45] Aug. 12, 1975

[54] TEMPERATURE COMPENSATED VOLTAGE REFERENCE DEVICE

[75] Inventor: Eugene H. Gaudreault, Oakdale, Minn.

[73] Assignee: Minnesota Mining and Manufacturing Company, St. Paul, Minn.

[22] Filed: Feb. 14, 1974

[21] Appl. No.: 442,422

[52] U.S. Cl. ................ 307/297; 307/237; 307/304; 307/310

[51] Int. Cl. ........................... H03k 1/14; H03k 1/04

[58] Field of Search ........... 307/296, 297, 304, 310, 307/237; 323/8, 22 T

[56] References Cited

UNITED STATES PATENTS

| | | | |
|---|---|---|---|
| 3,192,405 | 6/1965 | Patchell | 307/310 X |
| 3,700,934 | 10/1972 | Swain | 307/297 X |
| 3,760,199 | 9/1973 | Graeme | 307/310 X |
| R27,596 | 3/1973 | Hurd | 307/297 X |

OTHER PUBLICATIONS

Hunter, *Handbook of Semiconductor Electronics*, Third Edition, McGraw-Hill, Inc., pp. 4–34 to 4–37 and 13–10 to 13–11, 1970.

Gosling, *Field Effect Transistor Applications*, John Wiley & Sons Inc., 1965, pp. 27-33 and 137–140.

*Primary Examiner*—Michael J. Lynch
*Assistant Examiner*—L. N. Anagnos
*Attorney, Agent, or Firm*—Alexander, Sell, Steldt & DeLaHunt

[57] ABSTRACT

A temperature compensated voltage reference device has a field effect transistor that is reverse biased at a particular operating point so that temperature Variation of the biasing voltage across the gate to source junction of the field effect transistor is substantially negated by a forward biased bipolar transistor that has a temperature dependent voltage across its base to emitter junction.

6 Claims, 2 Drawing Figures

TEMPERATURE COMPENSATED VOLTAGE REFERENCE DEVICE

BACKGROUND OF THE INVENTION

1. Field of the Invention

The present invention relates to temperature compensated D.C. voltage references for providing a particular output control signal upon sensing an input voltage that equals or exceeds a predetermined level.

2. Description of the Prior Art

Temperature compensated zener diodes are commonly used in the art to provide a reliable and inexpensive means for furnishing a reference voltage with a low temperature-coefficient. However, the performance of zener diodes decreases substantially at voltage levels less than 6 volts, and thus zener diodes have proven unsatisfactory for use at such low voltage levels.

To provide precise temperature compensated voltage references below a six volt level several alternatives have been developed, as evidenced by U.S. Pat. to Widlar, No. 3,571,630. A double diffused transistor is disclosed in Widlar as a substitute for a zener diode. Such transistor has a thin base region in order that the reverse breakdown voltage between the emitter and the collector is less than the reverse voltage between the emitter and the base. The collector and emitter terminals of the double diffused transistor are connected across the output terminals of the device, and when a predetermined reverse voltage level is reached across the emitter and collector a breakdown of the transistor occurs. Temperature compensation is not inherent in the disclosed transistor, but may be provided by the addition of a number of additional transistors in a circuit associated with the diffused transistor.

A second alternative to the use of zener diodes for providing temperature compensated voltage regulation is described in Dobkin "1.2 Volt Reference," National Semiconductor AN-56, December, 1971. The device described therein employs a pair of bipolar transistors that are connected together such that the difference in the emitter to base voltage between the two transistors has a positive temperature coefficient that is compensated by a negative temperature coefficient derived from a third transistor in the circuit to produce a desired output voltage signal.

Although both of the described circuits furnish relatively precise, temperature compensated voltage regulation, neither of the described circuits is satisfactory for providing a temperature compensated voltage reference of under 1 volt, or at current levels below 100 microamps.

SUMMARY OF THE INVENTION

The present invention resides in an improved temperature compensated voltage reference having a field effect transistor with a temperature dependent reverse bias voltage across its gate to source junction, and a junction means that has a forward bias junction voltage with a temperature dependence that is operatively opposite to that of the field effect transistor gate to source junction.

In a preferred embodiment the gate of the field effect transistor is connected to a resistive voltage dividing network that biases the field effect transistor in a near pinch-off condition to produce a high current gain in the field effect transistor. The diode means is in the form of a bipolar transistor that has a base to emitter junction voltage temperature coefficient substantially equal to the temperature coefficient of a gate to source bias voltage of the field effect transistor when such field effect transistor is operated near its pinched-off mode. The base to emitter junction of the bipolar transistor is connected in series with the gate to source junction of the field effect transistor so that temperature produced variations in the bias voltage of the field effect transistor are substantially cancelled by similarly produced variations in the junction voltage of the bipolar transistor. Furthermore, the high current gain of the field effect transistor produces sharp control over the conduction of the bipolar transistor and results in precise performance over a wide range of voltage levels and temperatures.

The foregoing and other advantages of the present invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

The present invention is adapted to provide a temperature compensated reference device for monitoring an input voltage and providing a particular output control signal when the monitored input signal reaches or exceeds a predetermined nonzero level. Such output control signal may be in the form of a voltage, current or variation in output resistance.

Figure 1:
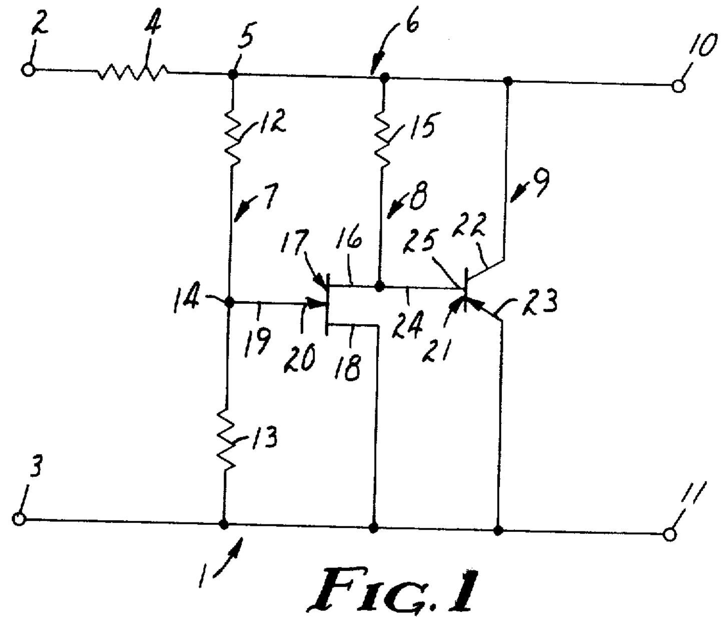
FIG. 1 is a schematic diagram of a preferred embodiment of the voltage reference of the present invention.

Referring now to the drawings and with specific reference first to FIG. 1, a presently preferred embodiment of the present invention is shown in the form of a temperature compensated voltage regulator 1 that monitors a D.C. supply voltage applied at input terminals 2 and 3. One end of a resistor 4 is connected to the input terminal 2 and the other end of the resistor 4 is connected to a node 5 of a regulating circuit 6 that includes three circuit branches 7, 8 and 9. Each of the branches 7, 8 and 9 electrically connects between the node 5 and the input terminal 3, and the voltage across the branches 7, 8 and 9, at terminals 10 and 11, is the regulated output voltage of the regulator 1.

The circuit branch 7 is formed of a resistor 12 connected in series with a resistor 13 at a node 14. The circuit branch 8 includes a resistor 15 electrically connected at one end to the node 5 and at its opposite end to a source terminal 16 of an N-type field effect transistor (FET) 17. A drain terminal 18 of the FET 17 electrically connects with the input terminal 3. Joining the two branches 7 and 8 is a lead 19 that interconnects the node 14 of the branch 7 with a gate terminal 20 of the FET 17. The third circuit branch 9 is formed of a PNP bipolar transistor 21 that has a collector 22 electrically connected with the node 5, and an emitter 23 connected to the input terminal 3. Joining the circuit branches 8 and 9 is a lead 24 that connects the FET source terminal 16 to a base terminal 25 of the transistor 21 in order that the gate to source junction of the FET 17 is connected in series with the base to emitter junction of the transistor 21. However, it is not essential to the present invention that the bipolar transistor 21 be employed in the regulating circuit 6. Instead, the transistor 21 may be replaced with other types of junction means such as a semiconductor diode having its cathode connected to the FET source terminal 16.

The resistors 12 and 13 of the circuit branch 7 serve as a voltage dividing biasing means to provide a particular reverse bias potential to the FET gate terminal 20. The desired regulated voltages supplied by the regulator 1 are obtained by choosing the proper values of the resistors 12 and 13. Such resistors must be chosen so that the ratio of $R_{13}/R_{12}+R_{13}$ multiplied by the desired regulated voltage across the terminals 10 and 11 is approximately equal to the sum of the gate to source voltage ($V_{GS}$) of the FET 17 and the base to emitter ($V_{BE}$) voltage of the transistor 21. The value of the resistor 15 should be sufficiently greater than the value of the drain to source resistance of the FET 17 at zero $V_{GS}$ in order that the $V_{GS}$ of the FET 17 is nearly equal to the pinch-off voltage of the FET 17. Accordingly, the FET 17 will operate in a nearly pinched-off condition in which little current flows from the drain terminal 18 to the source terminal 16 (such current is commonly referred to as $I_{DS}$) of the FET 17. In such condition, the effective gain of the FET 17 is high.

To more fully explain the present invention, the operation of the regulator 1 will now be described. When a voltage is applied to the input terminals 2 and 3 that exceeds the magnitude of the desired regulated voltage, the $I_{DS}$ of the FET 17 is reduced and the forward base biasing voltage of the transistor 21 increases. Due to such increased biasing voltage, the collector current flow through the transistor 21 is raised a sufficient amount to compensate for the difference between the desired regulated voltage output at the terminals 10 and 11 and the voltage supplied at the terminals 2 and 3. This is because the higher current flow through the transistor 21 increases the total current passing through the resistor 4, thereby raising the voltage drop across the resistor 4 sufficiently to equal the difference between the input voltage and the desired regulated voltage. Thus, the desired output voltage is provided across the terminals 10 and 11, which output is responsive to changes in the impedance between the source terminal 16 and the drain terminal 18 of the field effect transistor 17.

Temperature compensation is provided in the regulator 1 through the series connection between the gate to source junction of the FET 17 and the base to emitter junction of the bipolar transistor 21. With the FET 17 biased near its pinched-off mode, the temperature coefficient of the gate to source junction of the FET 17 is substantially equal in magnitude to that of the base to emitter junction of the transistor 21. The transistor 21 and FET 17 are connected in such fashion that temperature produced variations in the reverse biasing voltage potential across the gate to source junction of the FET 17 are substantially negated by similarly produced variations in the forward biasing voltage potential across the base to emitter junction of the transistor 21.

Accordingly, the present invention provides a temperature compensated voltage reference device that is relatively simplistic in both design and operation but yet provides precisely controlled regulated voltages over a wide range of voltages supplied and is useful for the supply of voltage levels less than 1 volt and current levels less than $10^{-6}$ amps. To insure that voltage levels supplied by the present invention are maintained precise in spite of variations in the temperature of the environment in which the present invention is employed, the regulator 1 is adapted to have inherent temperature compensation that provides typical regulation of better than ±2% over a range of −50°C to 100°C with standard quality components.

Figure 2:
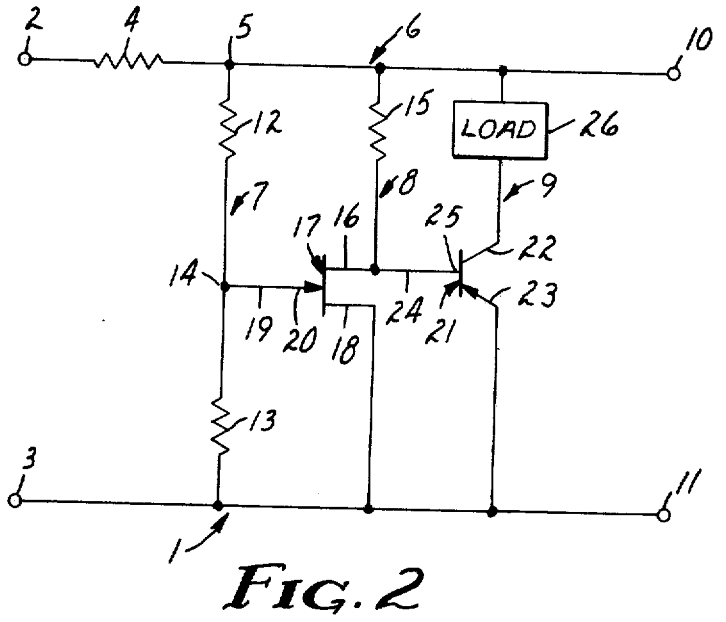
FIG. 2 is a schematic diagram of a modified embodiment of that shown in FIG. 1.

The above described embodiment of the present invention provides a shunt regulating circuit, but the present invention is not limited to such use. Instead, the present invention may be modified for employment in a voltage sensing capacity by electrically connecting an output load 26 between the collector of the transistor 21 and the node 5 as shown in FIG. 2. The load 26 may be in the form of an electronic switch or amplifier that is actuated by increased current flow through the transistor 21 when a predetermined voltage is applied to the input terminals 2 and 3.

Although specific forms of the present invention have been herein described, it is expected that changes can be made in the described embodiment and that other embodiments can be designed by those skilled in the art which will remain within the true spirit and scope of this invention.

What is claimed is:

1. A temperature compensated voltage reference device for monitoring at least a portion of an applied input voltage and providing an output control signal when the applied input voltage reaches a predetermined nonzero level, which reference device comprises:

- a pair of output terminals;
- a pair of input terminals to which said input voltage is applied;
- a source of bias voltage;
- a bipolar transistor having a base terminal, a collector terminal connected to one of said output terminals, and an emitter terminal connected to the other of said output terminals, which transistor has a temperature dependent junction voltage across its base to emitter junction;
- a field effect transistor having a gate terminal, a drain terminal connected to said other of said output terminals, and a source terminal connected to the base terminal of said bipolar transistor, which transistor has a temperature dependent bias voltage across its gate to source junction;
- a biasing means connected across said input terminals and joined to the gate of said field effect transistor to bias the same near a pinched-off condition; and
- a resistive means connected at one end to said source of bias voltage and connected at an opposite end to the source terminal of said field effect transistor so that current flow through said bipolar transistor is increased when current flow through said field effect transistor decreases, and temperature variations in the bias voltage of said field effect transistor are substantially negated by temperature variations in the junction voltage of said bipolar transistor.

2. A temperature compensated voltage reference device for monitoring an applied input voltage and providing an output control signal when the applied input voltage reaches a predetermined nonzero level, which device comprises:

a pair of output terminals;

a pair of input terminals to which said input voltage is applied;

a source of bias voltage;

a field effect transistor having a gate terminal, a source terminal electrically connected to one of said output terminals, and a drain terminal connected to the other of said output terminals, which transistor has a temperature dependent bias voltage across said gate and source terminals;

a biasing means connected across said input terminals and joined to the gate of said field effect trnsistor to bias the same near a pinched-off condition;

a junction means connected in series with the gate and source terminals of said field effect transistor and having a first terminal and a second terminal across which a temperature dependent junction voltage exists, which voltage has a temperature dependency substantially equal to that of said bias voltage across said gate and source terminals to compensate for variations in said bias voltage due to temperature changes.

3. A reference device as recited in claim 2 wherein the source terminal of said field effect transistor is connected to said one of said output terminals by a resistive means.

4. A voltage reference device as recited in claim 2 wherein the output of said device is in response to an electrical change in the source to drain circuit of said field effect transistor.

5. A voltage reference device as recited in claim 2 wherein said junction means is the base to emitter junction of a bipolar transistor.

6. A temperature compensated voltage reference device for monitoring at least a portion of an applied input voltage and providing an output control signal when the applied input voltage reaches a predetermined nonzero level, which reference device comprises:

a pair of output terminals;

a pair of input terminals to which said input voltage is applied;

a source of bias voltage;

a field effect transistor having a gate terminal, a drain terminal connected to one of said output terminals, and a source terminal, which transistor has a temperature dependent bias voltage across its gate and source terminals;

a biasing means connected across said input terminals and joined to the gate of said field effect transistor to bias the same near a pinched-off condition;

a junction means having a first terminal and a second terminal across which a temperature dependent forward junction voltage exists, which voltage has a temperature dependency substantially equal to that of said bias voltage across said gate and source terminals and said junction means is connected in series with the gate and source terminals of said field effect transistor so that temperature produced variations in the junction voltage of said junction means oppose similar variations in the bias voltage across the gate and source terminals of said field effect transistor; and a resistive means connected at one end to the other of said output terminals and connected at an opposite end to the source terminal of said field effect transistor so that current flow through said junction means is increased when current flow through said field effect transistor decreases and temperature variations in the bias voltage of said field effect transistor are substantially negated by temperature variations in the junction voltage of said junction means.

* * * * *